W. M. BRADSHAW AND C. A. BODDIE.
ELECTRICAL MEASURING INSTRUMENT.
APPLICATION FILED JUNE 13, 1917.
1,400,018.
Patented Dec. 13, 1921.
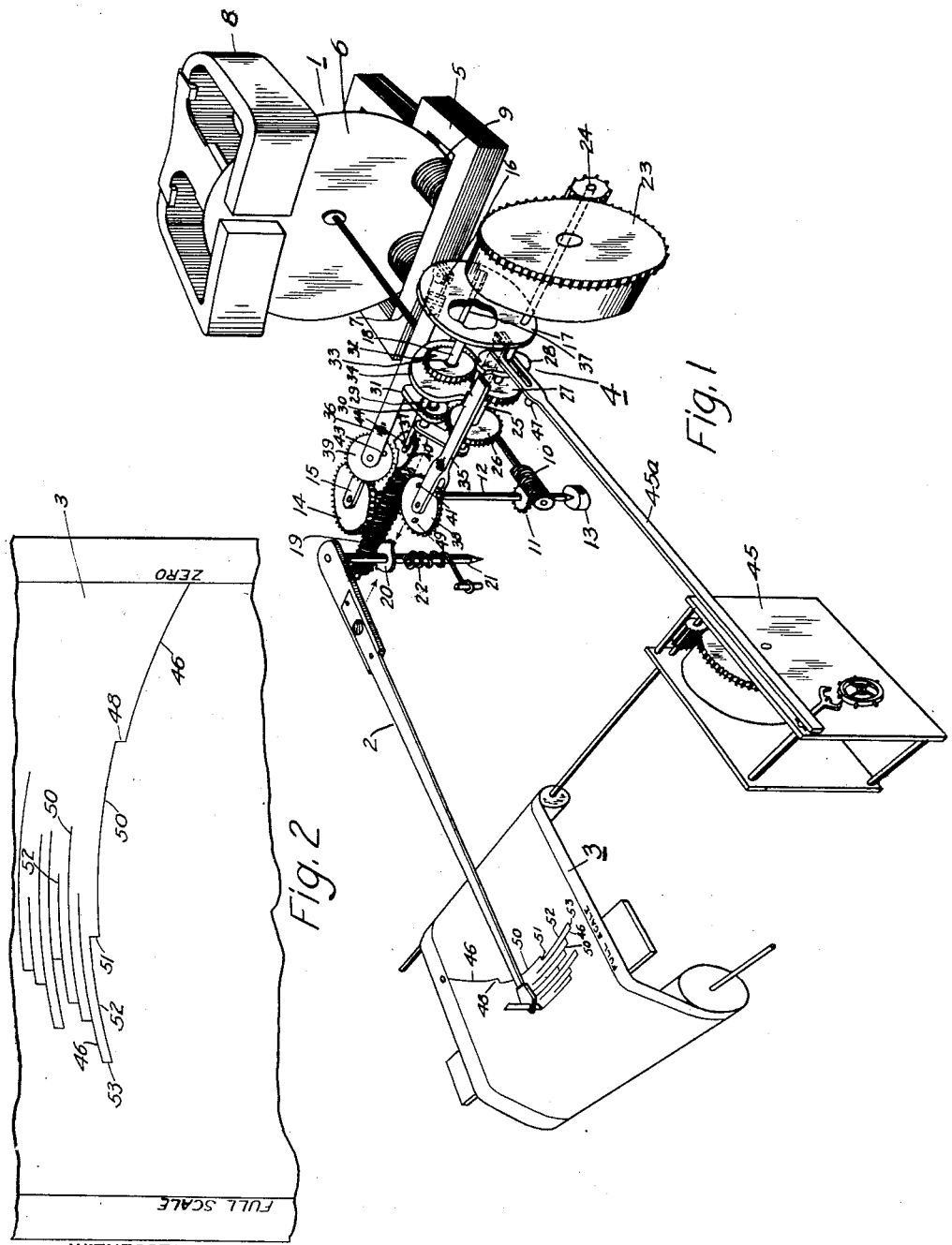
WITNESSES:
Fred. C. Wilharm
J. H. Procter
INVENTORS
William M. Bradshaw &
Clarence A. Boddie
BY
Wesley G. Carr
ATTORNEY

UNITED STATES PATENT OFFICE.

WILLIAM M. BRADSHAW, OF WILKINSBURG, AND CLARENCE A. BODDIE, OF PITTSBURGH, PENNSYLVANIA, ASSIGNORS TO WESTINGHOUSE ELECTRIC AND MANUFACTURING COMPANY, A CORPORATION OF PENNSYLVANIA.

ELECTRICAL MEASURING INSTRUMENT.

1,400,018.  Specification of Letters Patent.  Patented Dec. 13, 1921.

Application filed June 13, 1917. Serial No. 174,450.

*To all whom it may concern:*

Be it known that we, WILLIAM M. BRADSHAW, a citizen of the United States, and a resident of Wilkinsburg, in the county of Allegheny and State of Pennsylvania, and CLARENCE A. BODDIE, a citizen of the United States, and a resident of Pittsburgh, in the county of Allegheny and State of Pennsylvania, have invented a new and useful Improvement in Electrical Measuring Instruments, of which the following is a specification.

Our invention relates to electrical measuring instruments and particularly to demand meters.

One object of our invention is to provide a meter of the above indicated character that shall have means for recording the demand of energy for predetermined intervals of time.

Another object of our invention is to provide means for measuring the difference between the total energy that has traversed the meter up to a predetermined moment and the total energy that has traversed the meter for a predetermined period of time previous to that moment.

A further object of our invention is to provide a meter of the above indicated character that shall be simple to construct and efficient and accurate in its operation.

In demand meters, it is desirable to record or indicate the demand equivalent of the energy that is measured during predetermined intervals of time. In view of the above, we provide means for measuring the energy that is consumed up to a predetermined moment, the total energy that is consumed during a predetermined period of time previous to that moment and the difference between the two values. The difference between the two values represents the total energy consumed during the predetermined time that has elapsed and, consequently, represents the demand equivalent or the demand for energy during this time.

In the accompanying drawings, Figure 1 is a diagrammatic view of a demand meter embodying our invention, and Fig. 2 is a detail view of the record produced by the meter shown in Fig. 1.

The demand meter embodying our invention comprises, in general, a measuring instrument 1, such as a wattmeter, an ammeter, a water meter or other similar device, a recording or marking device 2, a record sheet 3 and a clock-actuated mechanism 4 for controlling the resetting operation of the recording device 2 and the advance of the record sheet 3.

The measuring instrument 1 comprises a magnetizable core member 5, an armature 6 that is mounted on a shaft 7, damping magnets 8 and windings 9. A worm screw 10 is mounted on the shaft 7 and is adapted to engage a gear wheel 11 that is mounted on a shaft 12 which is pivotally supported, at one of its ends, by a bearing 13. A gear wheel 14 is also mounted on the shaft 12, and the shaft is supported, at its upper end, by one end of an arm 15, the other end 16 of which is pivotally connected to a plate or supporting member 17. A non-rotatable shaft 18 is secured to the plate 17 and is adapted to receive a slidable worm screw or cylindrical rack 19. The rack or worm screw 19 is adapted to engage the gear wheel 14 and also a segmental pinion 20 that is mounted on a shaft 21. The recording or marking device 2 is also mounted on the shaft 21 which is provided with a relatively light resetting spring 22 that is adapted to move the marking device 2 in a clockwise direction, under predetermined conditions.

A clock mechanism 23 is adapted to drive, through a pinion 24, a shaft 25 upon which two gear wheels 26 and 27 and a cam 28 are mounted. The gear wheel 26 is adapted to engage a pinion 29 that is mounted upon a sleeve 30 upon which is also mounted a cam 31. The sleeve 30 loosely surrounds the shaft 18 and is adapted to rotate, in this case, once every five minutes. That is, the shaft 25 is adapted to rotate once every fifteen minutes and the gear ratio between the gear wheel 26 and the pinion 29 is three-to-one. The gear wheel 27 is adapted to engage a gear wheel 32 that is mounted on a sleeve 33 upon which is also mounted a cam 34. The sleeve 33 loosely surrounds the shaft 18 and is adapted to be rotated at the same speed as the shaft 25 and the gear wheel 27. That is, it is adapted to rotate, in this case, once every fifteen minutes. Three arms 35, 36 and 37 are pivotally mounted on the plate 17 at equal distances from each other and are adapted to support, at their outer ends, gear wheels 38, 39 and 40, respectively. The gear wheels 38, 39 and 40 are adapted to engage the worm screw or rack 19, under predetermined conditions, and are provided with pins 41, 42 and 44, respectively, that are adapted to engage the arms 35, 36 and 37, under predetermined conditions.

The cam member 34 is of such shape that it engages two of the arms 35, 36 and 37 at one time to maintain two of the gear wheels 38, 39 and 40 out of engagement with the worm screw or rack 19 while it permits the gear wheels 38, 39 and 40 to successively engage the worm screw 19 for periods of five minutes each. That is, the gear wheel 38 engages the worm screw 19 for a predetermined length of time, such as five minutes, and is then moved out of engagement by the cam member 34, and the gear wheel 39 next engages the worm screw 19 for five minutes and is similarly moved out of engagement with the worm screw 19 which is next engaged by the gear wheel 40. Thus, the gear wheels 38, 39 and 40 are adapted to successively engage the worm screw 19 for intervals of time of five minutes each or any other desired equal time intervals in accordance with the desired demand period. The cam member 28 is adapted to control a clock mechanism 45 through a rod 45ᵃ which is adapted to advance the record sheet 3 a predetermined distance every five minutes or other convenient interval of time in accordance with the interval of time that the gear wheels 38, 39, and 40 are successively in engagement with the worm screw 19.

The cam member 31 is adapted to engage the supporting arm 15 of the gear wheel 14 for the purpose of disengaging the same from the worm screw 19 for a short interval of time every five minutes, or other desired demand interval, to thereby permit the spring 22 to move the marking device 2 backwardly after each advance of the record sheet 3.

Assuming that the gear wheel 38 is in engagement with the worm screw 19 and that the meter 1 is driving the marking device 2 through the gear wheel 14, the worm screw 19 and the pinion 20, the marking device 2 will advance along a line 46 until the end of the predetermined demand interval which, as heretofore assumed, may be five minutes. At the end of five minutes, the cam member 28 will so engage a pin 47 on the rod 45ᵃ that the clock mechanism 45 will advance the record sheet 3 a distance equal to the line 48, as shown on the record sheet 3. While the gear wheel 14 is moving the worm screw or rack 19 along the shaft 18 as shown by the full-line arrow, the pin 41 on the gear wheel 38 is being turned a predetermined distance and, for convenience in explaining, it may be assumed to have the position shown at 49.

At the expiration of the five-minute interval of time, the cam member 34 so engages the arm 35 that the gear wheel 38 becomes disengaged from the rack 19, and the gear wheel 39 is moved into engagement therewith. After the gear wheel 39 has been moved into engagement with the rack 19, the cam device 31 so moves the supporting arm 15 that the gear wheel 14 becomes disengaged from the rack 19. However, since the pin 43 is in engagement with the supporting arm 35, the spring 22 is not permitted to move the marking device 2 backwardly. After the cam device 31 has permitted the gear wheel 14 to reëngage the rack 19, the meter 1 advances the marking device 2 along the line 50, as shown on the record sheet 3. Similarly, after the expiration of a five-minute interval of time, during which interval the pin 43 has been moved a distance equal to the energy that has traversed the meter 1, the record sheet 3 is again advanced along the line 51 and the gear wheel 40 is moved into engagement with, and the gear wheel 39 is moved out of engagement with, the rack 19. Similarly, the gear wheel 14 is moved out of engagement with the rack 19 for a short interval of time by the movement of the cam member 31. However, since the pin 44 is in engagement with the arm 37, the spring 22 is not permitted to reset the marking device 2.

When the gear wheel 14 again engages the rack 19, the meter 1 advances the marking device 2 along a line 52, as shown on the record sheet 3, for a period of five minutes during which time the pin 44 is moved a distance equal to the energy that has traversed the meter during the interval of time that the gear wheel 40 is connected to the rack 19. After the expiration of this five-minute or other desired interval of time, the record sheet 3 is advanced a distance equal to the line 53 and the gear wheel 40 is moved out of engagement with the rack 19 and the gear wheel 38 is again moved into engagement with the rack 19. The cam device 31 again disengages the gear wheel 14 from the rack 19 and, since the pin 41 is in the position shown at 49, the spring 22 will move the marking device 2 in a clockwise direction a distance equal to the distance that the pin 41 moved in assuming the position indicated at 49 or, in other words, a distance equal to the length of the line 46, as shown on the record sheet 3.

When the spring 22 moves the marking device 2 in a clockwise direction, the rack 19 is moved along the shaft 18 as shown by the broken line arrow, and the pin 41 assumes its normal position in engagement with the arm 35. Thus, when the cam 31 permits the gear wheel 14 to engage the rack 19, the measuring instrument 1 again causes the marking device 2 to advance in a counter-clockwise direction an amount equal to the energy that has traversed the instrument during an interval of time of five minutes. This causes the pin 41 to be again moved an amount equal to the energy that has traversed the meter 1 during the interval of time that it is connected to the rack 19. After the expiration of the five-minute interval of time, the record sheet 3 is again advanced and the gear wheel 39 is moved into engagement with, and the gear wheel 38 is moved out of engagement with, the rack 19. After the gear wheel 39 has moved into engagement with the rack 19, the gear wheel 14 is moved out of engagement, and the spring 22 will reset the marking device 2 an amount equal to the previous movement of the pin 43 or a distance equal to the line 50, as shown on the record sheet 3. Thus, at the expiration of each five-minute or other predetermined interval of time, the marking device is reset an amount equal to the energy that has traversed the meter during a previous predetermined interval of time. In other words, the marking device 2 is reset periodically by an amount equal to its second previous or other desired indication.

By resetting the marking device an amount equal to a previous indication, the difference between the total energy consumed during a predetermined period of time and that consumed up to a predetermined period of time previous to that time is obtained. This represents what may be termed the demand equivalent or the demand for energy at that interval of time. That is, by successively subtracting the previous five-minute indication from the indication at the end of a predetermined period the result represents the demand equivalent of energy over a period of fifteen minutes. However, since the subtracting is successive from one fifteen-minute interval to another the indication at all times is the demand equivalent during the previous fifteen-minute interval of time.

We do not limit our invention to the particular arrangement or structure illustrated, as it may be variously modified without departing from the spirit and scope of the invention as set forth in the appended claims.

We claim as our invention:

1. In a recording-measuring instrument, the combination with a measuring instrument, a recording device and a record sheet, of means for periodically advancing the record sheet and for resetting the recording device after each advance of the record sheet an amount equal to a predetermined previous indication of the recording device.

2. In a recording-measuring instrument, the combination with a measuring instrument, a recording device and a record sheet, of means for moving the recording device in the reverse of its normal direction of movement after each advance of the record sheet a predetermined distance in accordance with a previous indication of the recording device.

3. In a recording-demand meter, the combination with a measuring instrument, a marking device and a record sheet, of means for advancing the record sheet periodically and for moving the marking device backwardly an amount equal to a previous predetermined demand, as indicated by the marking device.

4. In a recording-demand meter, the combination with a measuring instrument, a marking device and a record sheet, of a clock mechanism for periodically advancing the record sheet and for controlling the resetting of the marking device after each advance of the record sheet an amount equal to a previous indication.

5. In a recording-demand meter, the combination with a measuring instrument, a marking device and a record sheet, of means for advancing the record sheet periodically and for resetting the marking device an amount equal to the second preceding indication of the marking device.

6. In a demand meter, the combination with a measuring instrument, and an indicating device therefor, of means for periodically resetting the indicating device an amount equal to its second preceding indication.

7. In a measuring instrument, the combination with an indicator adapted to indicate the energy that has traversed the instrument during a predetermined interval of time, of means for periodically resetting the indicator an amount equal to the energy indicated during an interval other than the next preceding interval of time.

8. In a demand meter, the combination with a measuring instrument and an indicator adapted to indicate the energy that has traversed the instrument during a predetermined interval of time, of means for causing the indicator to be reset at the end of each predetermined interval of time an amount in accordance with the energy indicated at the end of a predetermined previous interval of time.

9. In a demand meter, the combination with a measuring instrument, a marking device and a record sheet, of means for periodically advancing the record sheet, means for disconnecting the marking device from the measuring instrument after each advance of the record sheet, and a plurality of means for successively controlling the resetting of the marking device each time that it is disconnected from the measuring instrument an amount in accordance with its previous indications.

10. In a demand meter, the combination with a measuring instrument, a marking device and a record sheet, of a clock mechanism for periodically advancing the record sheet and for disconnecting the marking device from the measuring instrument after each advance of the record sheet, and a plurality of means actuated by the measuring instrument and the clock mechanism for controlling the resetting of the marking device each time that it is disconnected from the measuring instrument an amount in accordance with its previous indications.

11. In a demand meter, the combination with a measuring instrument, a marking device and a record sheet, of means for periodically advancing the record sheet and for periodically resetting the marking device after each advance of the record sheet an amount equal to a previous indication of the marking device.

12. In a demand meter, the combination with a measuring instrument, a marking device and a record sheet, of means for periodically advancing the record sheet and for periodically resetting the marking device after each advance of the record sheet an amount equal to the indication of the marking device during a previous predetermined period of time.

13. The combination with a measuring instrument and a record sheet, of means for marking a record on the record sheet that shall indicate, by a series of flat-topped figures, the energy measured by the instrument during predetermined intervals of time and the demand equivalent of the energy measured.

14. The combination with a measuring instrument and a record sheet, of means for forming a record on the record sheet that shall indicate the energy measured by the instrument during predetermined intervals of time and the demand equivalent of the energy measured.

15. The combination with a record sheet for a watthour meter, of means for recording the blocks of energy measured by the meter during predetermined intervals of time and the demand equivalent of these blocks of energy.

16. The combination with a watthour meter and a record sheet, of means for marking on the record sheet a series of substantially rectangular figures that indicate the energy measured by the meter during predetermined intervals of time and the demand equivalent of the energy measured.

17. The combination with a watthour meter, a record sheet and a single marking device, of means for causing the marking device to trace on the record sheet a series of substantially flat-topped figures that indicate the energy measured by the meter during predetermined intervals of time and the demand equivalent of the energy measured.

In testimony whereof, we have hereunto subscribed our names this 29th day of May, 1917.

WILLIAM M. BRADSHAW.
CLARENCE A. BODDIE.